United States Patent
Ge et al.

(10) Patent No.: US 11,656,382 B2
(45) Date of Patent: May 23, 2023

(54) LEAK INDUCED GUIDED WAVE AMPLITUDE LOG FOR DOWNHOLE LEAKAGE LOCALIZATION

(71) Applicant: Halliburton Energy Services, Inc., Houston, TX (US)

(72) Inventors: Yao Ge, Singapore (SG); Ruijia Wang, Singapore (SG); Xiang Wu, Singapore (SG); Jing Jin, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 349 days.

(21) Appl. No.: 16/891,646

(22) Filed: Jun. 3, 2020

(65) Prior Publication Data

US 2021/0109243 A1   Apr. 15, 2021

Related U.S. Application Data

(60) Provisional application No. 62/913,633, filed on Oct. 10, 2019.

(51) Int. Cl.
| | |
|---|---|
| *G01V 1/50* | (2006.01) |
| *G01V 1/46* | (2006.01) |
| *G01V 11/00* | (2006.01) |
| *E21B 47/117* | (2012.01) |
| *G01V 1/52* | (2006.01) |

(52) U.S. Cl.
CPC .............. *G01V 1/50* (2013.01); *E21B 47/117* (2020.05); *G01V 1/46* (2013.01); *G01V 1/52* (2013.01); *G01V 11/002* (2013.01)

(58) Field of Classification Search
CPC ... G01V 1/46; G01V 1/50; G01V 1/52; G01V 11/002; E21B 47/117
See application file for complete search history.

(56) References Cited

U.S. PATENT DOCUMENTS

| | | | |
|---|---|---|---|
| 4,870,627 A | 9/1989 | Hsu et al. | |
| 5,616,840 A * | 4/1997 | Tang | G01V 1/48 |
| | | | 73/152.16 |
| 7,970,544 B2 * | 6/2011 | Tang | G01V 1/50 |
| | | | 181/102 |
| 10,577,923 B2 * | 3/2020 | Nguyen | E21B 47/107 |
| 2010/0268489 A1 | 10/2010 | Lie et al. | |
| 2017/0212274 A1 | 7/2017 | Sun et al. | |
| 2017/0275987 A1 | 9/2017 | Al-Hussain et al. | |

FOREIGN PATENT DOCUMENTS

| | | |
|---|---|---|
| CN | 106287240 | 10/2018 |
| CN | 109538946 | 3/2019 |

OTHER PUBLICATIONS

International Search Report and Written Opinion for Application PCT/US2020/036682, dated Sep. 18, 2020.

* cited by examiner

*Primary Examiner* — Franklin D Balseca
(74) *Attorney, Agent, or Firm* — John Wustenberg; C. Tumey Law Group PLLC

(57) ABSTRACT

A method for identifying a leak for dynamic logging may comprise estimating a Stoneley wave slowness, separating a Stoneley wave into an up-going Stoneley wave and a down-going Stoneley wave, estimating an amplitude of the up-going Stoneley wave and the down-going Stoneley wave, identifying a difference between the amplitude of the up-going Stoneley wave and the down-going Stoneley wave, forming an amplitude summation curve or an amplitude difference curve, and identifying a location of the leak.

20 Claims, 7 Drawing Sheets

LEAK INDUCED GUIDED WAVE AMPLITUDE LOG FOR DOWNHOLE LEAKAGE LOCALIZATION

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR).

During the life of the well, an acoustic logging tool may be utilized to examine casing strings to determine a condition of the casing string. A utilization of an acoustic sensor array may allow for the detection of a leak through acoustic signals generated by the leak, such as a flow of fluid through the leak. The sensor array could be a downhole hydrophone array, or a fiber distributed acoustic sensor. Currently, logging tools for detecting an acoustic wave from an acoustic source such as a leak may utilize only direct body arrival waves from the acoustic source to the receiver array. In such tools, the receiver array may be a large distance from the acoustic source. The direct body arrival waves from the acoustic source may be weak due to geometric diffusion, and consequently, may not provide information about a direction and intensity of the acoustic source. The direct body arrival waves from the acoustic source below 5 kilohertz are often ignored due to interference of low-frequency Stoneley arrival waves. The interference of the low-frequency Stoneley arrival waves may prevent the processing of acoustic signals from detecting the leak in a casing string.

BRIEF DESCRIPTION OF THE DRAWINGS

These drawings illustrate certain aspects of some examples of the present disclosure and should not be used to limit or define the disclosure.

DETAILED DESCRIPTION

The present disclosure may generally relate to techniques for predicting a leakage location and a leakage intensity with leakage induced Stoneley waves. For dynamic logging, processing raw data for up-going Stoneley waves and down-going Stoneley waves may directly yield a noise position and level due to a cross-over of amplitudes of the up-going and the down-going waves. For static logging, techniques disclosed herein may provide a direction of the noise and guide movement of a downhole tool within a wellbore.

Figure 1:
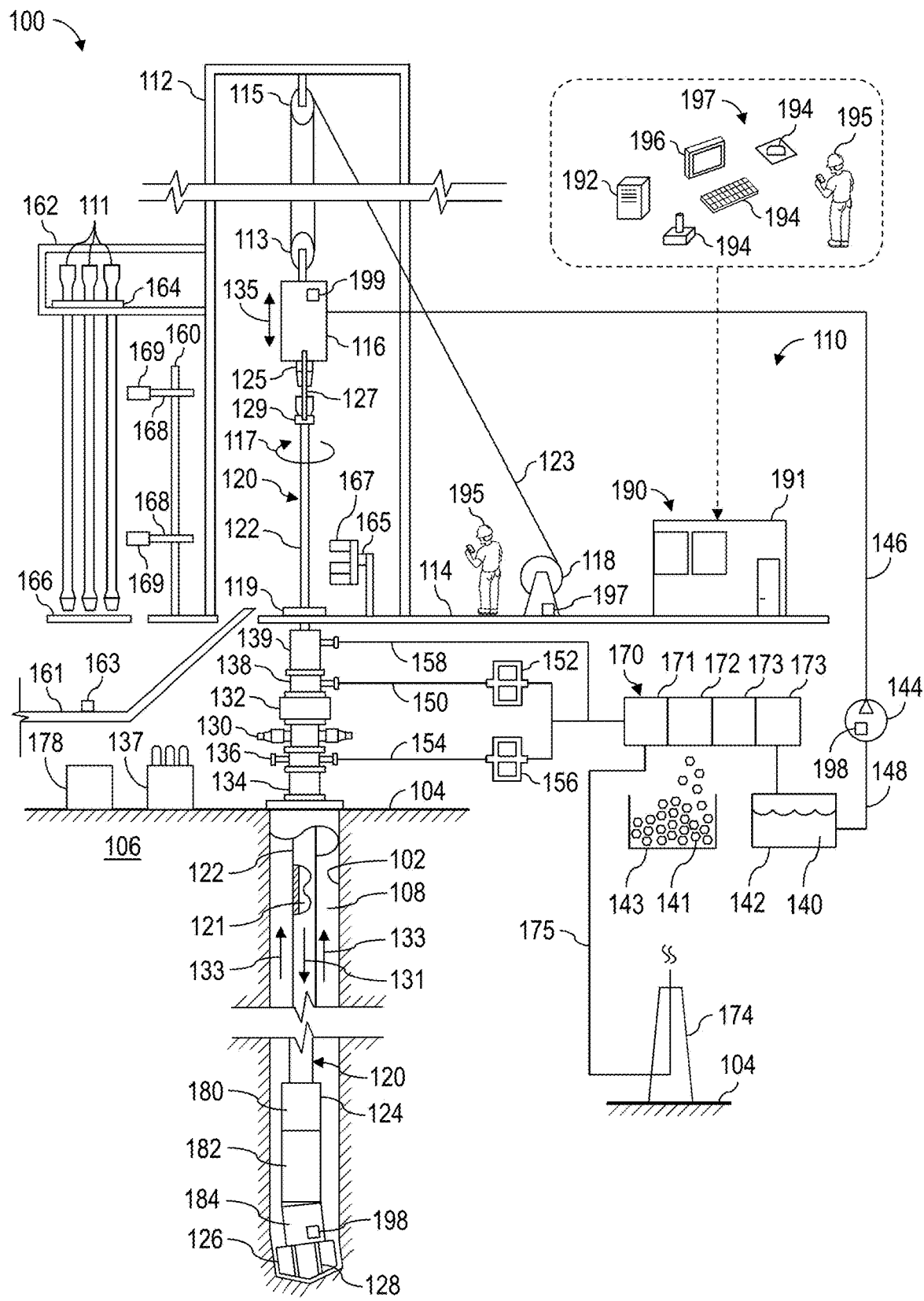
FIG. 1 illustrates an acoustic logging tool system, in accordance with some embodiments of the present disclosure.

FIG. 1 illustrates an operating environment for an acoustic logging tool 100 as disclosed herein. The acoustic logging tool 100 may comprise at least a receiver 104. In some examples, there may be any number of receivers 104, which may be disposed on the acoustic logging tool 100. The acoustic logging tool 100 may be operatively coupled to a conveyance 106 (e.g., wireline, slickline, coiled tubing, pipe, downhole tractor, and/or the like) which may provide mechanical suspension, as well as electrical connectivity, for the acoustic logging tool 100. The conveyance 106 and the acoustic logging tool 100 may extend within a casing string 108 to a desired depth within a wellbore 110 extending into a subterranean formation 111. The conveyance 106, which may include one or more electrical conductors, may exit a wellhead 112, and may pass around pulley 114, may engage an odometer 116, and may be reeled onto a winch 118, which may be employed to raise and lower the acoustic logging tool 100 in the wellbore 110. Signals recorded by the acoustic logging tool 100 may be stored in memory and then processed by a display and storage unit 120 after recovery of the acoustic logging tool 100 from the wellbore 110. Alternatively, the signals recorded by the acoustic logging tool 100 may be transmitted to the display and storage unit 120 by way of the conveyance 106. The display and storage unit 120 may process the signals, and the information contained therein may be displayed for an operator to observe and stored for future processing and reference. Alternatively, the signals may be processed downhole prior to receipt by the display and storage unit 120 or both downhole and at a surface 122, for example, by the display and storage unit 120. The display and storage unit 120 may also contain an apparatus for supplying control signals and power to the acoustic logging tool 100. The casing string 108 may extend from the wellhead 112 at or above ground level to a selected depth within the wellbore 110. The casing string 108 may comprise a plurality of joints 130 or segments of the casing string 108, each joint 130 being connected to adjacent segments by a collar 132. There may be any number of layers in the casing string 108. For example, a first casing 134 and a second casing 136.

FIG. 1 also illustrates a pipe string 138, which may be positioned inside of the casing string 108 extending part of the distance along the wellbore 110. The pipe string 138 may be production tubing, tubing string, casing string, or other pipe disposed within the casing string 108. The pipe string 138 may comprise concentric pipes. It should be noted that concentric pipes may be connected by collars 132. The acoustic logging tool 100 may be dimensioned so that it may be lowered into the wellbore 110 through the pipe string 138, thus avoiding the difficulty and expense associated with pulling pipe string 138 out of the wellbore 110.

In logging systems, such as, for example, logging systems utilizing the acoustic logging tool 100, a digital telemetry system may be employed, wherein an electrical circuit may be used to both supply power to the acoustic logging tool 100 and to transfer data between the display and storage unit 120 and the acoustic logging tool 100. A DC voltage may be provided to the acoustic logging tool 100 by a power supply located above ground level, and data may be coupled to the DC power conductor by a baseband current pulse system. Alternatively, the acoustic logging tool 100 may be powered by batteries located within the downhole tool assembly, and/or the data provided by the acoustic logging tool 100 may be stored within the downhole tool assembly, rather than transmitted to the surface 122 during logging.

As illustrated, one or more receivers 104 may be positioned on the acoustic logging tool 100. It should be understood that the configuration of the receivers 104 shown on FIG. 1 is merely illustrative and other configurations of the receivers 104 may be used with the present techniques. The receivers 104 may include any suitable acoustic receiver suitable for use downhole, including piezoelectric elements that may convert acoustic waves into an electric signal or hydrophones, for example. Additionally, the receivers 104 may record any waves generated by, leakage or a flow event inside and/or outside of the wellbore 110.

Figure 2:
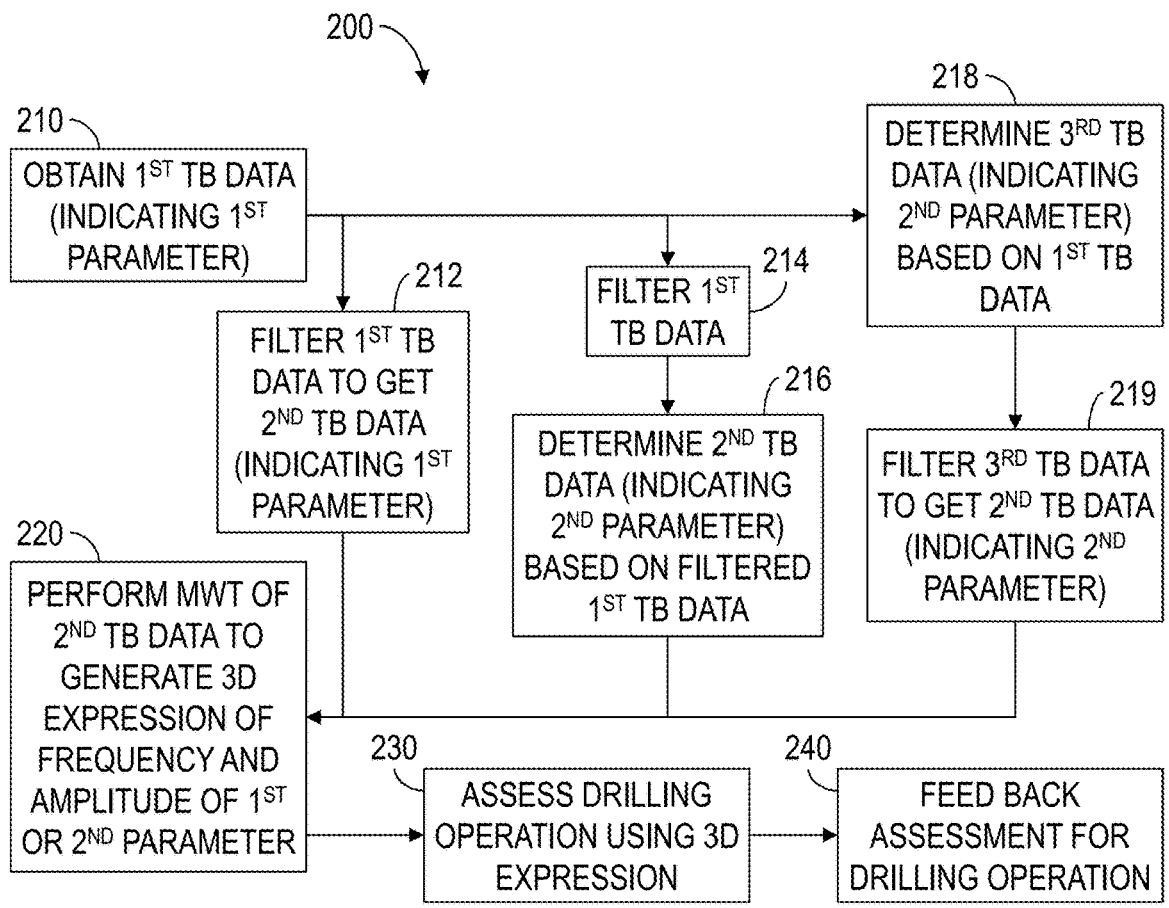
FIG. 2A illustrates a receiver, in accordance with some embodiments of the present disclosure.
FIG. 2B illustrates a configuration of receivers, in accordance with some embodiments of the present disclosure.

FIG. 2A illustrates a receiver 104, in accordance with certain examples of the present disclosure. The receivers 104 may include a segmented piezoelectric tube, an individual receiver, azimuthal receivers, or hydrophones, for example. However, other suitable receivers may be utilized, as should be understood by one having skill in the art, with the benefit of this disclosure.

FIG. 2B illustrates a configuration of the receivers 104, in accordance with some examples of the present disclosure. The receivers 104 may positioned in a circular configuration that extends circumferentially around the acoustic logging tool 100, as shown on FIG. 1, for example. The receivers 104 may be disposed on an outer surface of the acoustic logging tool 100 or the receivers 104 may be disposed within the acoustic logging tool 100, in some examples.

Referring back to FIG. 1, recordation of signals by the receivers 104 may be controlled by the display and storage unit 120, which may include an information handling system 144. As illustrated, the information handling system 144 may be a component of the display and storage unit 120. Alternatively, the information handling system 144 may be a component of acoustic logging tool 100. The information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. The non-transitory computer readable media 148 may include any instrumentality or aggregation of instrumentalities that may retain data and/or instructions for a period of time. The non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. The information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with the acoustic logging tool 100 and/or software executed by the processing unit 146. For example, the information handling system 144 may enable an operator to select analysis options, view collected log data, view analysis results, and/or perform other tasks.

Figure 3:
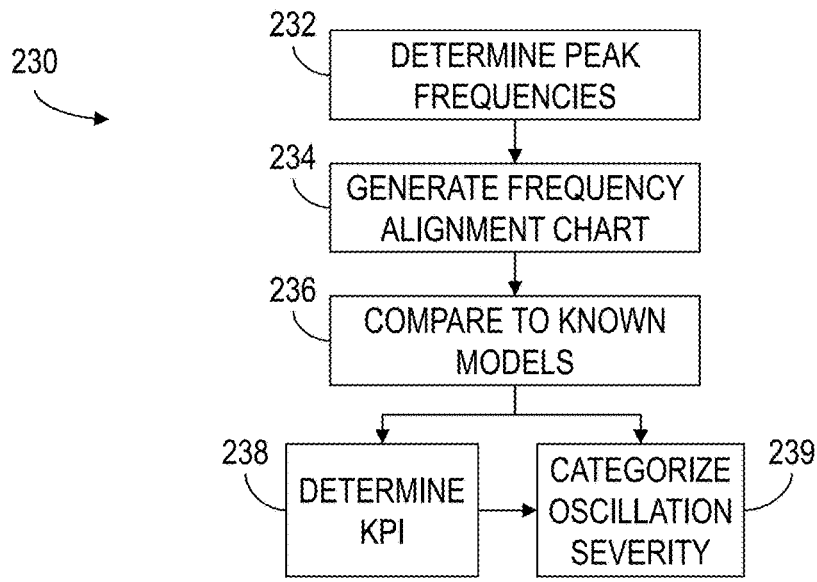
FIG. 3 illustrates an acoustic logging tool during a logging operation, in accordance with some embodiments of the present disclosure.
Figure 4:
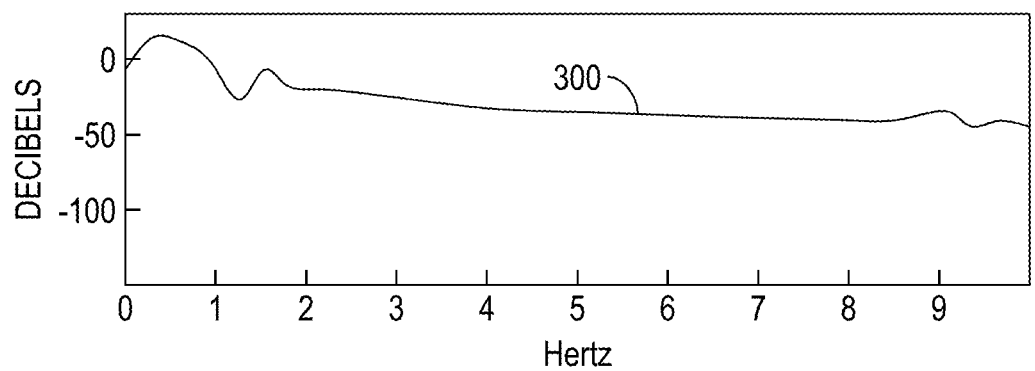
FIGS. 4A-4D illustrates a distributed acoustic sensing system during a measurement operation, in accordance with some embodiments of the present disclosure.

FIG. 3 illustrates the acoustic logging tool 100 with a receiver array 300, in accordance with some examples of the present disclosure. The receivers 104 in the receiver array 300 may extend longitudinally along the acoustic logging tool 100. Without limitation, there may be any number of the receivers 104 disposed on or in the acoustic logging tool 100. During measurement operations, the acoustic logging tool 100 may detect a depth and radial location of a leak 302 (e.g., an acoustic or noise source) or a flow of fluid 304, in wellbore 110. In certain examples, the acoustic logging tool 100 may be deployed with one or more stabilizers 306 installed above (e.g., up-hole) or below (e.g., downhole) acoustic logging tool 100. The acoustic logging tool 100 may be disposed in the pipe string 138 which may be disposed in a first casing 134, both of which may extend into the subterranean formation 111, in some examples. During operation, each receiver 104 of the receiver array 300 may sense and record any number of acoustic signals, repeatedly, as the acoustic logging tool 100 moves up-hole or downhole along the wellbore 110 within the pipe string 138. The recorded acoustic signals may be transmitted to the information handling system 144 (e.g., shown on FIG. 1), which may process each recorded acoustic signal with a beamforming algorithm to identify a location or position of the leak 302 which may pass fluid 304 between an interior and exterior of the pipe string 138, for example. Beamforming is a signal processing technique used in the receiver array 300 for directional signal transmission or reception. This may be achieved by combining waveforms by a phased array in such a way that signals at particular angles experience constructive interference while others experience destructive interference.

The acoustic signals recorded by the one or more receivers 104 may include guided-wave noise 308, in certain examples. The guided wave noise 308 may be a borehole acoustic wave propagating along the pipe string 138 or the first casing 134. In certain examples, the guided-wave noise 308 may propagate up-hole or downhole along any casing. The guided wave noise 308 may be induced by a logging operation. For example, an excitation from stabilizers 306 may strike the pipe string 138 and/or the first casing 134 and reverberate up and down a length of the pipe string 138 and/or the first casing 134, as Stoneley wave propagation. Stoneley wave arrivals may also be generated by the leak 302. The Stoneley wave arrivals may be dominant arrivals among all the captured acoustic signals. Additionally, since Stoneley waves may not be affected by geometric diffusion, the Stoneley waves may be measured even if the receiver array 300 is not in a vicinity of the leak 302, for example.

During measurement operations, acoustic signals above 5 kilohertz (kHz) may be considered direct arrivals, while signals below 5 kHz may be ignored. Acoustic signals below 5 kHz include strong leakage induced Stoneley arrivals. These Stoneley arrivals include both up-going waves and down-going waves as shown in FIG. 3, which may be utilized as an alternative source to evaluate the leak 302.

As noted above, the guided wave noise 308 may be created from the flow of the fluid 304 through the leak 302, for example. The guided wave noise 308 may propagate up and/or down the pipe string 138 and/or the first casing 134 and contaminate a direct arriving acoustic leak signal 310, which may be used for downhole leakage localization. When an amplitude from the guided wave noise 308 is higher than the direct arriving leak noise 310, the beamforming algorithm result may show a false positive for the leak 302 at a measurement location. A higher amplitude from the guided wave noise 308 may drown out the amplitude of the acoustic leak signal 310, which may hinder identification of the acoustic leak signal 310.

In some examples, the guided-wave noise 308 may be generated from equipment disposed or connected to acoustic logging tool 100 that may come into contact with the pipe string 138 and/or the first casing 134, which may emit a noise that is defined as road noise. For example, the stabilizers 306 may operate and function to center the acoustic logging tool 100 within the pipe string 138. The stabilizers 306 may perform this function by exerting a force on the inside surface of the pipe string 138. This force may cause stabilizers 306 to strike an inside surface of the pipe string 138 in a manner that creates noise. The vibration of this noise may travel in up-hole and downhole directions along the pipe string 138, as the guided wave noise 308. In certain examples, a distributed acoustic system using a downhole fiber (not shown) may be used in place of the receiver array 300.

FIGS. 4A-4D illustrate different types of deployments of a downhole fiber 400 in the wellbore 110 in a distributed acoustic system, in accordance with some examples of the present disclosure. Without limitation, the down hole fiber 400 may be permanently deployed in the wellbore 110 via a single-trip completion string or dual-trip completion strings, behind casing, on tubing, or in pumped down installations.

In some examples, the downhole fiber 400 may be temporarily deployed via coiled tubing, wireline, slickline, or disposable cables. As illustrated in FIG. 4A, the wellbore 110 may include surface casing 402 in which production casing 404 may be deployed. Additionally, production tubing 406 may be deployed within the production casing 404. In some examples, the downhole fiber 400 may be temporarily deployed in a wireline system in which a bottom hole gauge 410 is connected to the distal end of the downhole fiber 400. The downhole fiber 400 may be coupled to a fiber connection 408. Without limitation, the fiber connection 408 may attach downhole fiber 400 to the conveyance 106 (e.g., referring to FIG. 1). The fiber connection 408 may operate with an optical feedthrough system comprising a series of wet-mate and dry-mate optical connectors in the wellhead 112 that optically couple downhole fiber 400 from the tubing hanger, to conveyance 106 on the wellhead instrument panel. The conveyance 106 may include an optical flying lead, optical distribution system(s), umbilical termination unit(s), and transmission fibers encapsulated in flying leads, flow lines, rigid risers, flexible risers, and/or one or more conveyances 106. This may allow for the conveyance 106 to connect and disconnect from downhole fiber 400 while preserving optical continuity between the conveyance 106 and the downhole fiber 400.

FIG. 4B illustrates a permanent deployment of the downhole fiber 400, in accordance with examples of the present disclosure. As illustrated, the surface casing 402 and the production casing 404 may be deployed in the wellbore 110. Additionally, the production tubing 406 may be deployed within the production casing 404. In certain examples, the downhole fiber 400 may be attached to an outside surface of the production tubing 406 by one or more cross-coupling protectors 412. Without limitation, the cross-coupling protectors 412 may be evenly spaced and may be disposed on every other joint of the production tubing 406. The downhole fiber 400 may be coupled to a fiber connection 408 at one end and a bottom hole gauge 410 (e.g., a pressure sensor) at the opposite end.

FIG. 4C illustrates another permanent deployment of the downhole fiber 400, in accordance with some examples of the present disclosure. As illustrated, the surface casing 402 and the production casing 404 may be deployed in the wellbore 110. Additionally, the production tubing 406 may be deployed within the production casing 404. In some examples, the downhole fiber 400 may be attached to the outside surface of the production casing 404 by one or more cross-coupling protectors 412. Without limitation, the cross-coupling protectors 412 may be evenly spaced and may be disposed on every other joint of production tubing 406. The downhole fiber 400 may be coupled to the fiber connection 408 at one end and the bottom hole gauge 410 at the opposite end.

FIG. 4D illustrates a coiled tubing operation in which the downhole fiber 400 may be deployed temporarily, in accordance with some examples of the present disclosure. As illustrated, the surface casing 402 and production casing 404 may be deployed in the wellbore 110. Additionally, coiled tubing 414 may be deployed within the production casing 404. The downhole fiber 400 may be temporarily deployed in a coiled tubing system in which the bottom hole gauge 410 is connected to the distal end of the downhole fiber 400. The downhole fiber 400 may be attached to the coiled tubing 414, which may move the downhole fiber 400 through the production casing 404. The downhole fiber 400 may be coupled to the fiber connection 408 at one end and the bottom hole gauge 410 at the opposite end. During operation, the downhole fiber 400 may be used to take measurements within the wellbore 110, which may be transmitted to the surface 122 and/or the display and storage unit 120 (e.g., shown on FIG. 1).

Figure 5:
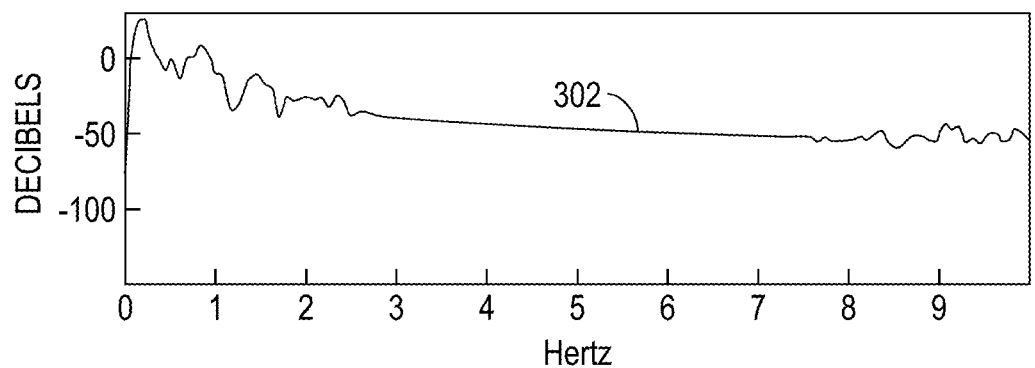
FIG. 5 illustrates a workflow for dynamic logging, in accordance with some embodiments of the present disclosure.

FIG. 5 illustrates a workflow 500 for dynamic logging, in accordance with some examples of the present disclosure. In the workflow 500, the acoustic logging tool 100 (e.g., referring to FIG. 1) may perform measurement operations while continuously moving downhole and up-hole within the wellbore 110. The workflow 500 may begin with block 502. In block 502, acoustic signals may be inputted into the information handling system 144 (e.g., referring to FIG. 1) from the receiver array 300 (e.g., referring to FIG. 3) through any suitable communication devices that may be wired and/or wireless. In block 504, a Stoneley wave slowness may be estimated by a semblance processing for a zone (e.g., a zone in the wellbore 110) that the receiver array 300 faces or is disposed within. For example, a differential phase time semblance processing may be performed, and Stoneley wave slowness may be estimated at a slowness value with minimal phase difference between the receivers 104 (e.g., referring to FIG. 3). In block 506, the estimated Stoneley wave slowness may be separated into up-going and down-going Stoneley waves by any wave separation approach, such as the least square method, for example. In block 508, amplitudes of up-going Stoneley waves and down-going Stoneley waves may be estimated with a root mean square (RMS) value or a summation of an envelope of waveform data. From estimated amplitudes in block 508, a difference and a summation of the amplitudes for up-going Stoneley waves and down-going Stoneley waves may be calculated in block 510. Difference logs may be created by subtracting the down-going Stoneley amplitudes from the up-going Stoneley amplitudes. The summation log may be achieved by a summation of the up-going wave amplitude log and the down-going wave amplitude log, for example. The Stoneley waves may originate from both road noise and the leak 302, as shown on FIG. 3, for example. The up-going waves and down-going waves generated from the road noise or the stabilizer 306 (both referred to as the guided-wave noise 308 as shown on FIG. 3, for example) may have the same amplitude, while the leak 302 (e.g., shown on FIG. 3) may create different (e.g., different amplitudes) up-going and down-going acoustic waves at the receiver array 300 (e.g., referring to FIG. 3). For example, if the receiver array 300 is up-hole from the leak 302, the receiver array 300 may capture only up-going waves from the leak 302, and under such a case, overall up-going waves, including both the guided-wave noise 308 and the leak 302, are stronger (e.g., larger amplitude) than the down-going waves. Vice versa, if the receiver array 300 is downhole from the leak 302, the receiver array 300 may capture only down-going waves from the leak 302, and under such a case, the up-going waves are weaker (e.g., smaller amplitude) than the down-going waves. Consequently, a comparison of up-going and down-going wave amplitudes may indicate a direction or location of the leak 302. When moving the acoustic logging tool 100 downhole to traverse or intersect the leak 302, the differences of up-going and down-going wave amplitudes may change from positive to negative values (e.g., a cross-zero point), and the cross-zero point of a log corresponds to the position of the leak 302. In some examples with a downhole fiber 400 (e.g., referring to FIG. 4), road noise may not exist, as the acoustic logging tool 100 is not moving in the wellbore 110 (e.g., referring to FIG. 1). As discussed above, the techniques used for the cross-zero point may also be used for a distributed acoustic logging system for a location of the leak 302. The amplitudes of the leak induced Stoneley waves may decrease as a distance between a receiver 104 and the leak 302 (e.g., shown on FIG. 3) increases due to attenuation of modes, and thus, Stoneley amplitudes may reach a maximum at a position of the leak 302. Therefore, a maximum value of an amplitude log may also indicate the location or position of the leak 302.

In block 512, the position of the leak 302 (e.g., referring to FIG. 3) may be determined by the cross-zero point of the difference curve and a local maximum on the amplitude summation curve. Once the position of the leak 302 is determined, in block 514 the level of the leak noise 310 (e.g., shown on FIG. 3) may be estimated by the value of the amplitude summation curve at the leakage position.

Figure 6:
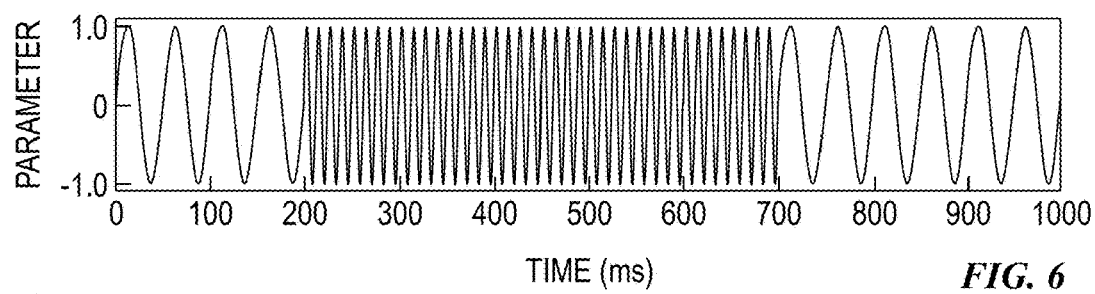
FIG. 6 illustrates a workflow for static logging, in accordance with some embodiments of the present disclosure.

FIG. 6 illustrates a workflow 600 for static logging, in accordance with examples of the present disclosure. Static logging may be performed when the acoustic logging tool 100 (e.g., referring to FIG. 1) is stopped at a certain depth in the wellbore 110 (e.g., referring to FIG. 1) or via the distributed acoustic system (e.g., referring to FIGS. 4A-4D). Because the acoustic logging tool 100 does not move during static logging, high quality data with no road noise may be recorded. As illustrated, the workflow 600 may begin with block 602. In block 602, acoustic signals may be inputted into the information handling system 144 (e.g., referring to FIG. 1) from the receiver array 300 (e.g., referring to FIG. 3) through any suitable communication devices that may be wired and/or wireless. In block 604, the Stoneley wave slowness may be estimated in a subterranean zone. From the estimated Stoneley slowness in block 604, in block 606 the estimated Stoneley wave slowness may be separated into up-going and down-going Stoneley waves. In block 608, amplitudes of up-going Stoneley waves and down-going Stoneley waves are estimated. In block 610, differences of the amplitudes of the up-going Stoneley waves and the down-going Stoneley waves may be compared. A comparison in block 610 may be processed further in block 612. For example, in block 612, if an up-going Stoneley wave is stronger (e.g., larger amplitude) than a down-going Stoneley wave, the leak 302 (e.g., referring to FIG. 3) is below or downhole from the acoustic logging tool 100. Otherwise, the leak 302 is above or up-hole from the acoustic logging tool 100. After determining the direction of the leak 302, in block 614, the acoustic logging tool 100 may be moved toward the leak 302. The workflow 600 may be repeated several times, moving the acoustic logging tool 100 at the end of each iteration or cycle of the workflow 600 to further refine the location of leak 302.

FIGS. 7A-7D illustrate graphical representations of data described in FIGS. 5 and 6, in accordance with some examples of the present disclosure. For example, FIG. 7A graphically illustrates a Power Density Spectrum log 700, for example. As illustrated, a power density 701 may be the greatest at a location of the leak 302 (e.g., shown on FIG. 3). For example, the power density (Watts per cubic meter) may be the greatest between 30 kHz and 40 kHz at a depth (e.g., measured depth) of 6961 ft (2121 meters).

Figure 7:
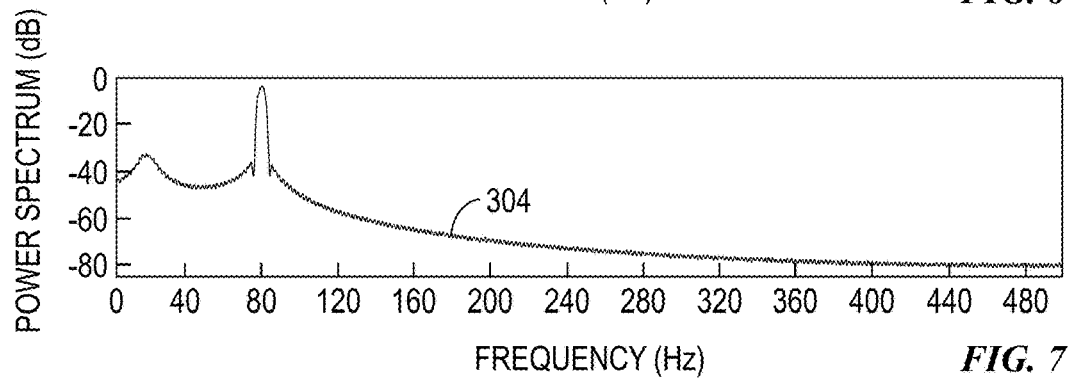
FIG. 7A illustrates a graph of a Power Density Spectrum log indicating a location of a leak, in accordance with some embodiments of the present disclosure.
FIG. 7B illustrates a graph of upward wave amplitudes and downward wave amplitudes, in accordance with some embodiments of the present disclosure.
FIG. 7C illustrates a graph of summations of upward and downward wave amplitudes to indicate the location of the leak, in accordance with some embodiments of the present disclosure.
FIG. 7D illustrates a graph of differences between upward and downward wave amplitudes to indicate the location of the leak, in accordance with some embodiments of the present disclosure.

FIG. 7B graphically illustrates upward and downward wave amplitudes according to some examples of the present disclosure. As illustrated, the upward and downward wave amplitudes may vary with depth and may approach or have an RMS wave amplitude value of 0 at a depth of 6961 ft (2121 meters), for example. The RMS wave amplitudes may approach 0 at a location of the leak 302 (e.g., shown on FIG. 3), for example. A reason that FIGS. 7A and 7B are showing 0 or near 0 amplitude near 6959 ft is due to temporary malfunction of a hydrophone or electronics at this particular pass. In most cases, a zero amplitude is uncommon, unless the overall signal amplitude is near zero.

FIG. 7C graphically illustrates summations of upward and downward wave amplitudes according to some examples of the present disclosure. FIG. 7C graphically illustrates a summation amplitude log 702 having a maximum value 703 that corresponds with a depth of 6961 ft (2121 meters), for example. The maximum value 703 may indicate a location of the leak 302 (e.g., shown on FIG. 3), for example.

FIG. 7D graphically illustrates a difference log 704 depicting differences between upward and downward wave amplitudes according to some examples of the present disclosure. FIG. 7D illustrates a cross-zero point 705 of the difference log 704. The cross-zero point 705 is a cross-over point between negative values and positive values, for example. The cross-over point 705 indicates a position of the leak 302 (e.g., shown on FIG. 3), which is at a depth of 6961 feet (ft) (2121 meters), for example.

Figure 8:
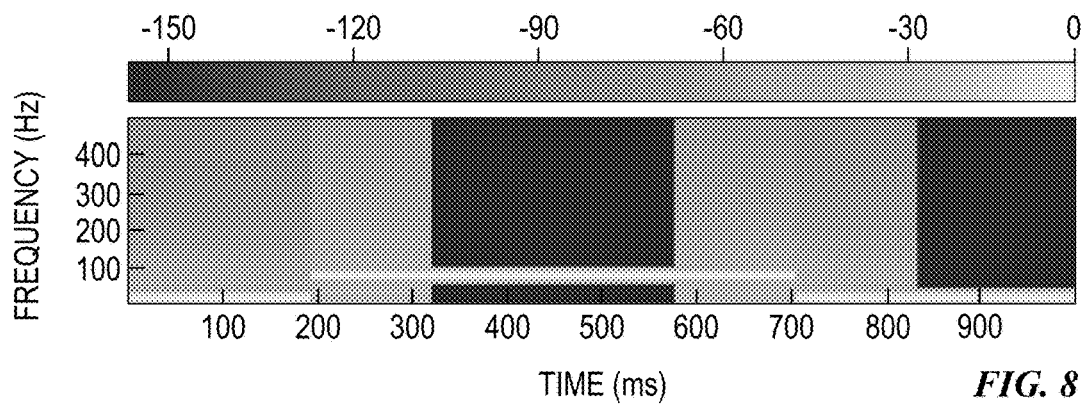
FIG. 8 illustrates a direct arrival image by a beamforming approach that indicates the location of the leak, in accordance with some embodiments of the present disclosure.

FIG. 8 illustrates a direct arrival wave (e.g., above 5 kHz) image 800 in accordance with some examples of the present disclosure. The direct arrival wave is sampled when the tool is located at 6961 ft (2121 meters). The direct arrival wave image 800 may be created with a beamforming approach. The intensity in image 800 represents the possibility of a leak occurring at each radial and depth location. A high intensity area 801 may indicate the leak 302 (e.g., shown on FIG. 3) at the depth of 6961 ft (2121 meters) and a radial location between 0.5 to 2 inches. The high intensity area 801 may correspond with the location estimation from the amplitude values of up-going and down-going Stoneley waves (e.g., FIGS. 7A-7D). A depth or position of the leak 302 (e.g., shown on FIG. 3) may further be validated by the cross-zero point 705 (e.g., shown on FIG. 7D) of the amplitude difference log between up-going and down-going Stoneley waves.

Figure 9:
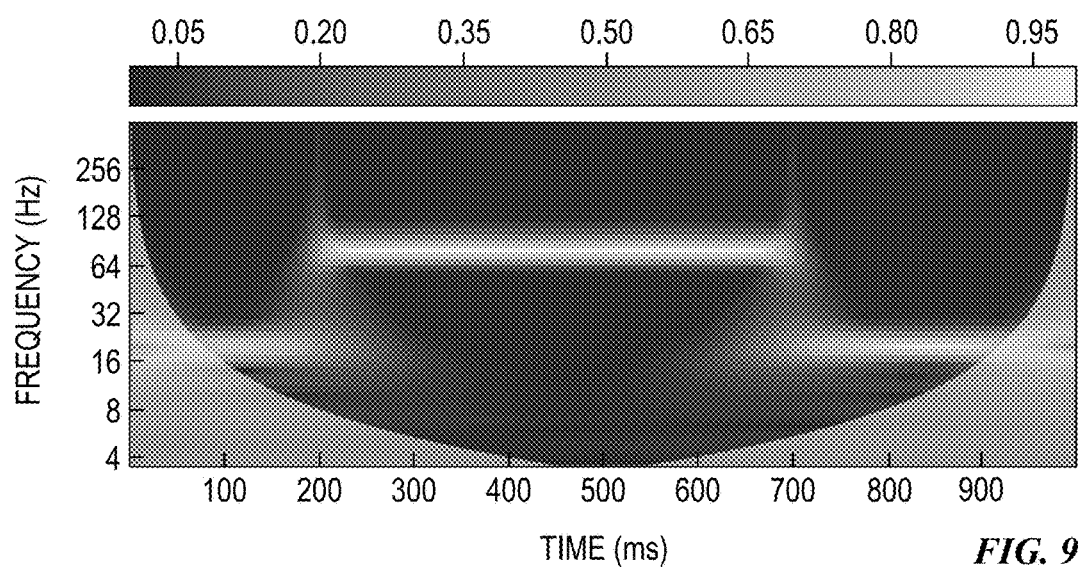
FIG. 9 illustrates a workflow for combining Stoneley waves and direct waves, in accordance with some embodiments of the present disclosure.

FIG. 9 illustrates a workflow 900 for combining Stoneley waves and direct arrival waves of FIG. 8, in accordance with some examples of the present disclosure. The workflow 900 may begin with block 902, in which acoustic signals may be inputted into the information handling system 144 (e.g., referring to FIG. 1), from the receiver array 300 (e.g., referring to FIG. 3) through any suitable communication devices that may be wired and/or wireless. In block 904, leakage induced Stoneley waves may be processed by techniques disclosed in FIGS. 5 and 6, for example. In block 906, direct arrival waves may be processed by beamforming. The direct arrival waves may also be processed by its amplitude and frequency spectrum. For example, the processing may be performed by a machine-learning scheme (e.g., artificial intelligence), which may be trained to predict a target physical feature of the leak 302 (e.g., shown on FIG. 3) using signal estimates from both the leakage induced Stoneley wave estimates and the direct arrival wave estimates. Then, a joint interpretation of direct body waves and guided waves may be performed in block 908.

Figure 10:
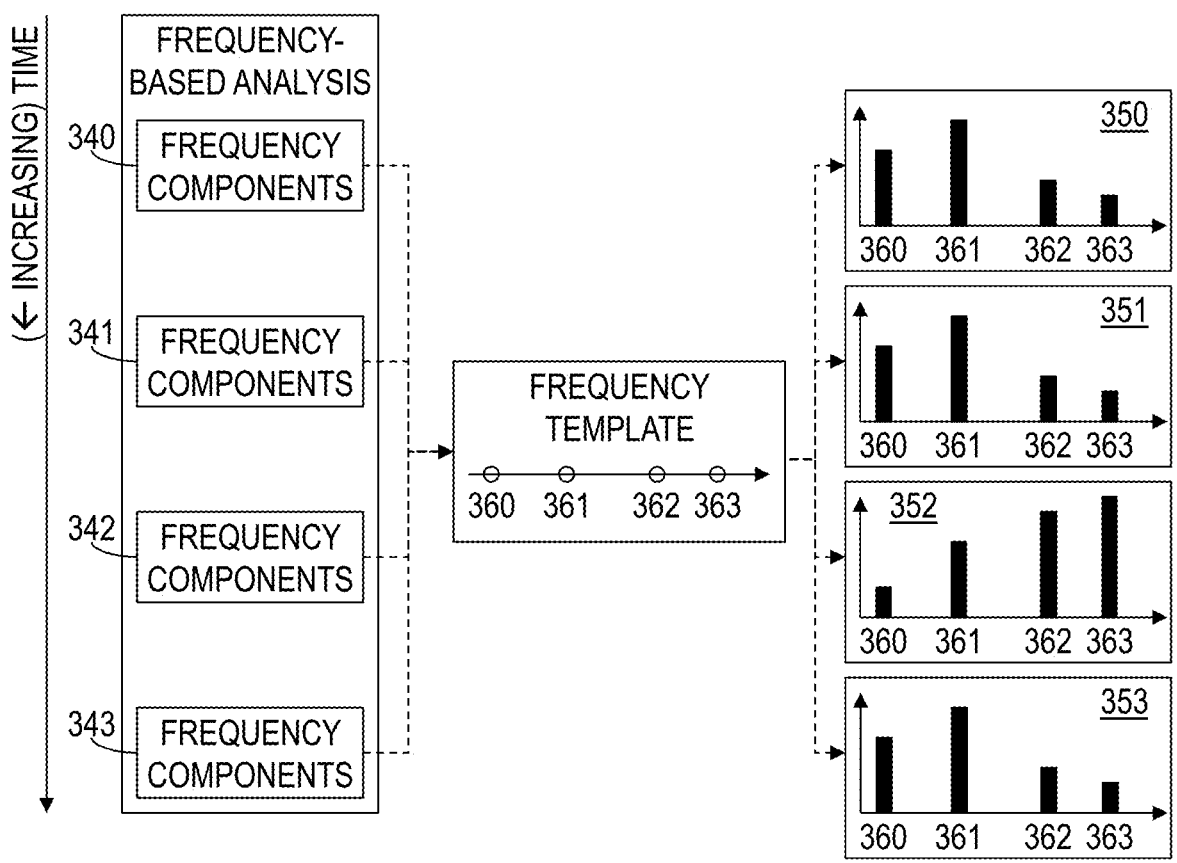
FIG. 10 illustrates a workflow for training a machine-learning system, in accordance with some embodiments of the present disclosure.
Figure 11:
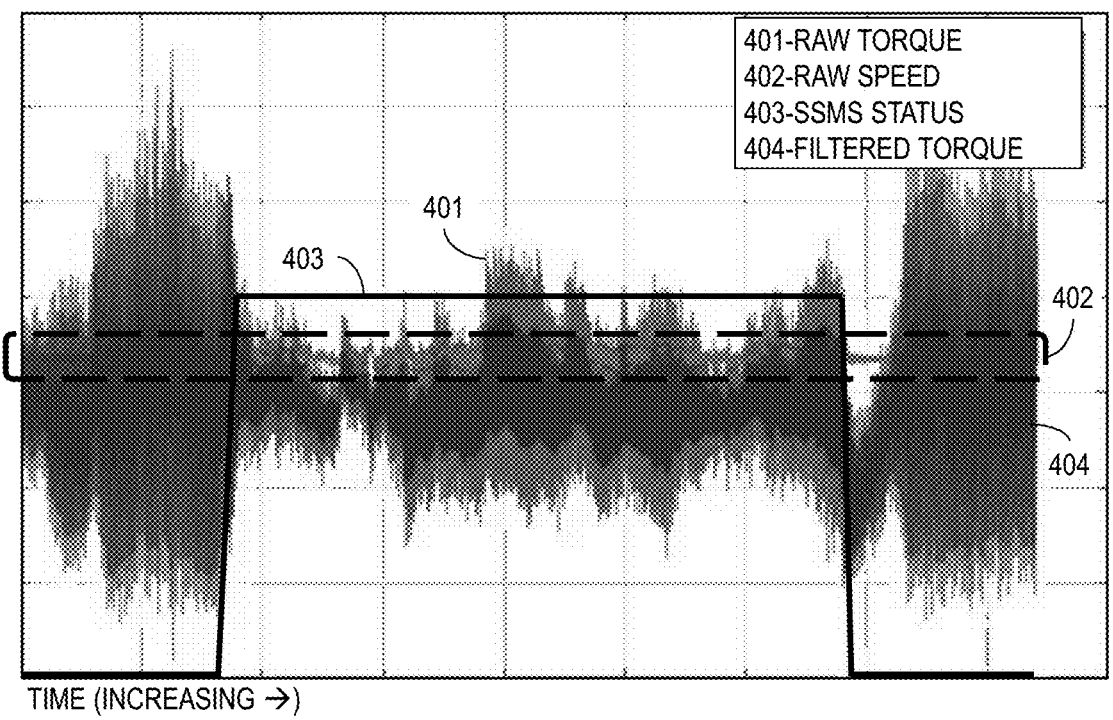
Figure 12:
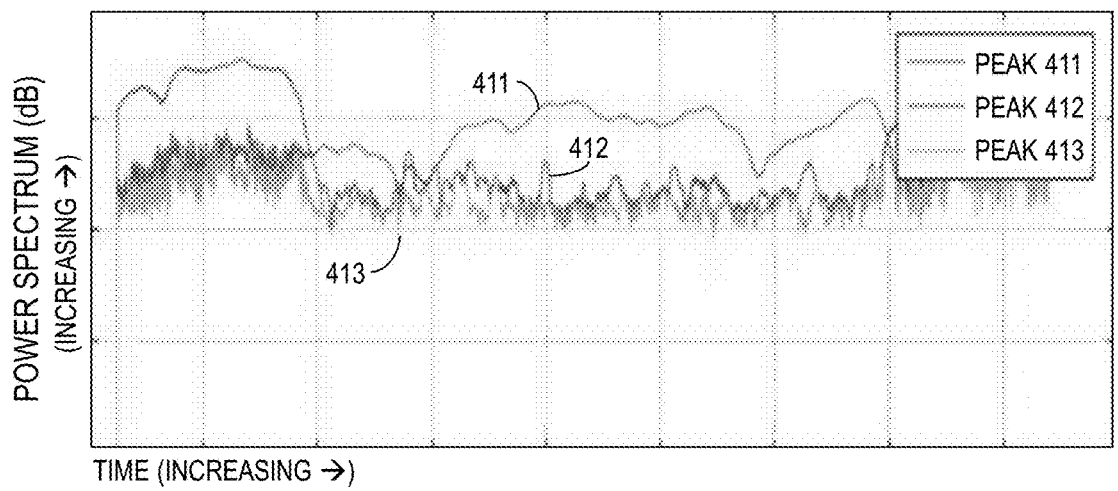
Figure 13:
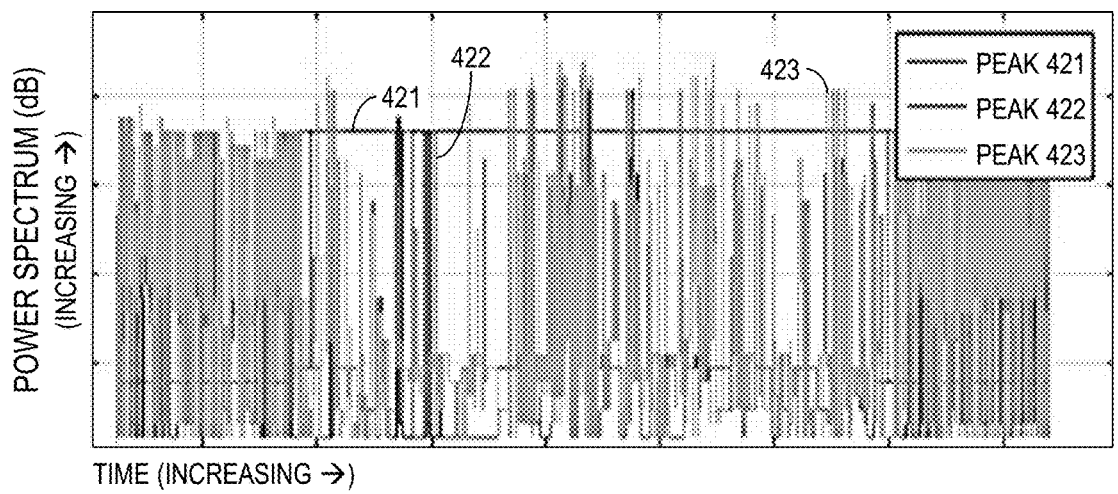
Figure 14:
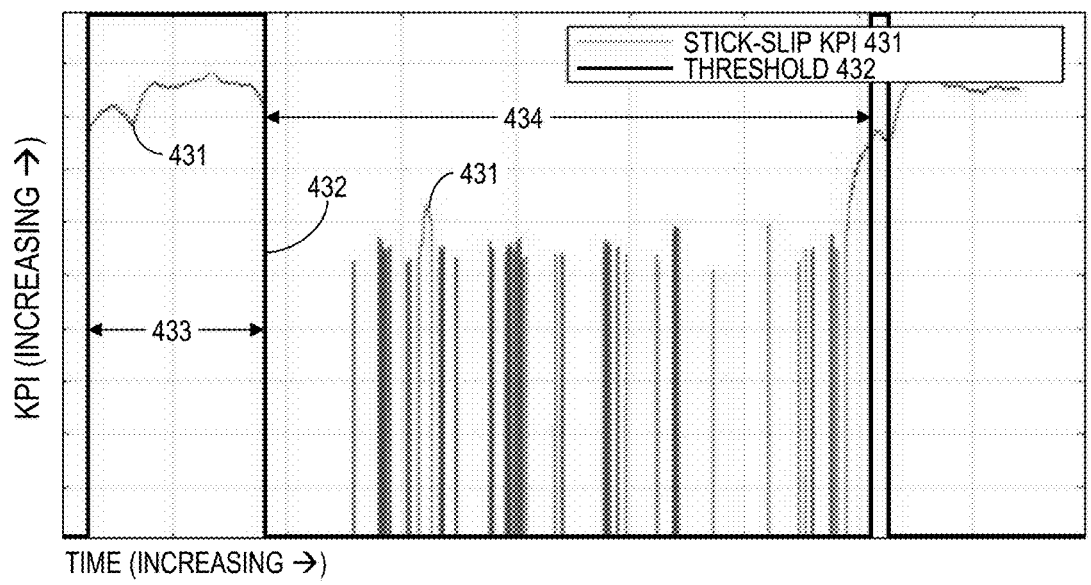
Figure 15:
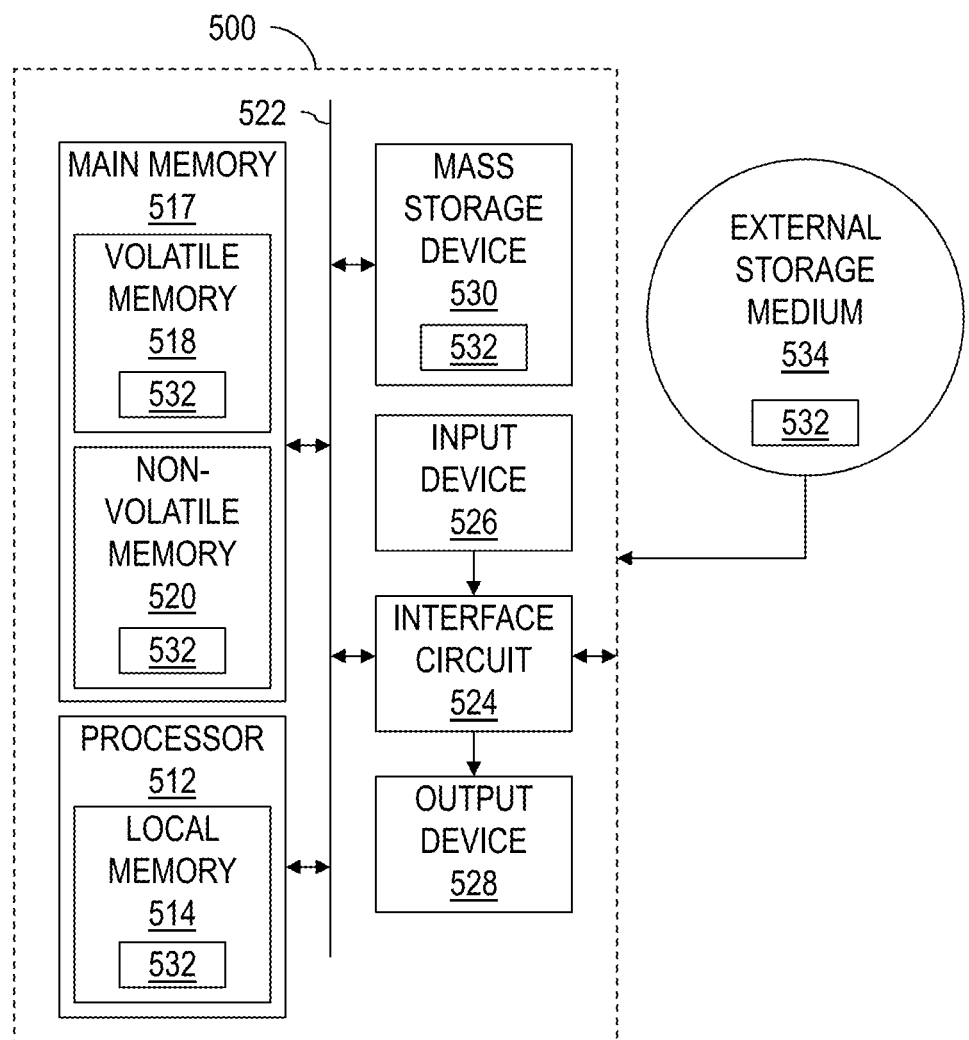

FIG. 10 illustrates a workflow 1000 for training a machine-learning scheme, in accordance with some examples of the present disclosure. The machine-learning scheme may be a support vector machine (SVM) or convolutional neural networks (CNN). In the workflow 1000, a library or a relationship between a guided wave and a direct wave response and the target physical feature of the leak 302 (e.g., shown on FIG. 3) may be created. Once created, a library or a relationship may be interpreted according to block 908 (e.g., shown on FIG. 9) and a physical feature of the leak 302 may be estimated based on the machine-learning scheme with the library or relationship. The workflow 1000 for a machine-learning scheme may begin with block 1002. In block 1002, field data may be collected and interpreted by an analyst. In block 1004, a pair of Stoneley wave and direct wave features from a source may be collected. Target physical features of the leak 302 may be estimated from acoustic data or other logs, such as logs from flowmeters, for example. The physical features of the leak 302 may include but are not limited to a flow rate, a leak location, and a sand production amount. In block 1006, the machine-learning system may be trained with data from blocks 1004 and 1002 and may create a library or a relationship between a guided wave and a direct wave response and a target physical feature of the leak 302. Once the machine-learning system is trained in block 1006, the trained machine-learning system may be implemented into a downhole system, such as the acoustic logging tool 100, to detect the leak 302 within the pipe string 138 (e.g., referring to FIG. 1) in block 1008. For example, recorded acoustic waves may be analyzed by the trained machine-learning system in real time to determine the leak 302 (e.g., referring to FIG. 3) during measurement operations. In some examples, the trained machine-learning system may control movement in up-hole and downhole directions of the acoustic logging tool 100 during measurement operations to determine the location of the leak 302 in the pipe string 138. This may improve efficiency of a logging operation with the acoustic logging tool 100 which may reduce cost. Additionally, the trained machine-learning system may improve the accuracy of the location of each leak 302 that may be within the pipe string 138.

Accordingly, the systems and methods of the present disclosure allow for predicting a leakage location and intensity utililzing leakage induced Stoneley waves. The systems and methods may include any of the various features disclosed herein, including one or more of the following statements.

Statement 1. A method for identifying a leak for dynamic logging, comprising: recording one or more acoustic signals as raw data; estimating a Stoneley wave slowness; separating a Stoneley wave into an up-going Stoneley wave and a down-going Stoneley wave; estimating an amplitude of the up-going Stoneley wave and the down-going Stoneley wave; identifying a difference between the amplitude of the up-going Stoneley wave and the down-going Stoneley wave; summing the amplitude of the up-going Stoneley wave and the down-going Stoneley wave to form an amplitude summation curve; and identifying a location of the leak.

Statement 2. The method of the statement 1, wherein the one or more acoustic signals are recorded by one or more receivers on an acoustic logging tool.

Statement 3. The method of the statement 2, further comprising moving the acoustic logging tool continuously within a wellbore.

Statement 4. The method of the statement 1, wherein the one or more acoustic signals are recorded by a fiber distributed acoustic sensor system.

Statement 5. The method of the statement 1, wherein the location of the leak is found with a cross-zero point of a difference curve.

Statement 6. The method of the statement 1, wherein the location of the leak is found with a local maximum on the amplitude summation curve.

Statement 7. The method of the statement 1, further comprising estimating a level of a leak noise by a value of the amplitude summation curve.

Statement 8. A method identifying a leak for static logging, comprising: recording one or more acoustic signals as raw data; estimating a Stoneley wave slowness; separating the Stoneley wave slowness in an up-going Stoneley wave and a down-going Stoneley wave; estimating an amplitude of the up-going Stoneley wave and the down-going Stoneley wave; comparing the amplitude of the up-going Stoneley wave and the down-going Stoneley wave; and identifying a location of the leak.

Statement 9. The method of the statement 8, wherein the one or more acoustic signals are recorded by one or more receivers on an acoustic logging tool.

Statement 10. The method of the statement 9, wherein the amplitude of the up-going Stoneley wave is less than the amplitude of the down-going Stoneley wave, wherein the leak is uphole from the acoustic logging tool.

Statement 11. The method of the statement 9, wherein the amplitude of the up-going Stoneley wave is greater than the amplitude of the down-going Stoneley wave, wherein the leak is downhole from the acoustic logging tool.

Statement 12. The method of the statement 8, wherein the one or more acoustic signals are recorded by a fiber distributed acoustic sensor system.

Statement 13. A system for identifying a leak in a casing string, comprising: an acoustic logging tool comprising: an acoustic array connected to the acoustic logging tool, wherein the acoustic array includes one or more receivers, wherein the one or more receivers are configured to record one or more acoustic signals; one or more stabilizers connected to the acoustic logging tool; a conveyance connected to at least one end of the acoustic logging tool; an information handling system connected to the acoustic logging tool and configured to: identify a leakage induced Stoneley wave; identify a direct arrival wave; and compare the leakage induced Stoneley wave and the direct arrival wave.

Statement 14. The system of the statement 13, wherein the identify the leakage induced Stoneley wave includes: estimate a Stoneley wave slowness; separate the Stoneley wave slowness in an up-going Stoneley wave and a down-going Stoneley wave; estimate an amplitude of the up-going Stoneley wave and the down-going Stoneley wave; identify a difference between the amplitude of the up-going Stoneley wave and the down-going Stoneley wave; sum the amplitude of the up-going Stoneley wave and the down-going Stoneley wave to form an amplitude summation curve; and identify a location of the leak.

Statement 15. The system of the statement 14, wherein the location of the leak is found with a cross-zero point of a difference curve.

Statement 16. The system of the statement 14, wherein the location of the leak is found with a local maximum on the amplitude summation curve.

Statement 17. The system of the statement 14, further comprising estimate a level of a leak noise by a value of the amplitude summation curve.

Statement 18. The system of the statement 13, wherein the identify the leakage induced Stoneley wave includes: estimate a Stoneley wave slowness; separate the Stoneley wave slowness in an up-going Stoneley wave and a down-going Stoneley wave; estimate an amplitude of the up-going Stoneley wave and the down-going Stoneley wave; compare the amplitude of the up-going Stoneley wave and the down-going Stoneley wave; and identify a location of the leak.

Statement 19. The system of the statement 18, wherein the amplitude of the up-going Stoneley wave is greater than the amplitude of the down-going Stoneley wave, wherein the leak is downhole from the acoustic logging tool.

Statement 20. The system of the statement 18, wherein the amplitude of the up-going Stoneley wave is less than the amplitude of the down-going Stoneley wave, wherein the leak is up-hole from the acoustic logging tool.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying a leak for dynamic logging, comprising:
   recording one or more acoustic signals as raw data;
   estimating a Stoneley wave slowness;
   separating a Stoneley wave into an up-going Stoneley wave and a down-going Stoneley wave;
   estimating an amplitude of the up-going Stoneley wave and the down-going Stoneley wave;
   identifying a difference between the amplitude of the up-going Stoneley wave and the down-going Stoneley wave;
   summing the amplitude of the up-going Stoneley wave and the down-going Stoneley wave to form an amplitude summation curve; and
   identifying a location of the leak.

2. The method of claim 1, wherein the one or more acoustic signals are recorded by one or more receivers on an acoustic logging tool.

3. The method of claim 2, further comprising moving the acoustic logging tool continuously within a wellbore while recording the one or more acoustic signals.

4. The method of claim 1, wherein the one or more acoustic signals are recorded by a fiber distributed acoustic sensor system.

5. The method of claim 1, wherein the location of the leak is found with a cross-zero point of a difference curve.

6. The method of claim 1, wherein the location of the leak is found with a local maximum on the amplitude summation curve.

7. The method of claim 1, further comprising estimating a level of a leak noise by a value of the amplitude summation curve.

8. A method identifying a leak for static logging, comprising:
recording one or more acoustic signals as raw data;
estimating a Stoneley wave slowness;
separating the Stoneley wave slowness in an up-going Stoneley wave and a down-going Stoneley wave;
estimating an amplitude of the up-going Stoneley wave and the down-going Stoneley wave;
comparing the amplitude of the up-going Stoneley wave and the down-going Stoneley wave;
identifying a difference between the amplitude of the up-going Stoneley wave and the down-going Stoneley wave;
summing the amplitude of the up-going Stoneley wave and the down-going Stoneley wave to form an amplitude summation curve;
identifying a location of the leak, wherein the location of the leak is found with a local maximum on the amplitude summation curve or a cross-zero point of a difference curve; and
estimating a level of a leak noise by a value of the amplitude summation curve.

9. The method of claim 8, wherein the one or more acoustic signals are recorded by one or more receivers on an acoustic logging tool.

10. The method of claim 9, wherein the amplitude of the up-going Stoneley wave is less than the amplitude of the down-going Stoneley wave, wherein the leak is uphole from the acoustic logging tool.

11. The method of claim 9, wherein the amplitude of the up-going Stoneley wave is greater than the amplitude of the down-going Stoneley wave, wherein the leak is downhole from the acoustic logging tool.

12. The method of claim 8, wherein the one or more acoustic signals are recorded by a fiber distributed acoustic sensor system.

13. A system for identifying a leak in a casing string, comprising:
an acoustic logging tool comprising:
an acoustic array connected to the acoustic logging tool, wherein the acoustic array comprises one or more receivers, wherein the one or more receivers are configured to record one or more acoustic signals;
one or more stabilizers connected to the acoustic logging tool; and
a conveyance connected to at least one end of the acoustic logging tool; and
an information handling system connected to the acoustic logging tool and configured to:
identify a leakage induced Stoneley wave;
identify a direct arrival wave; and
compare the leakage induced Stoneley wave and the direct arrival wave, wherein the identify the leakage induced Stoneley wave comprises:
estimate a Stoneley wave slowness;
separate the Stoneley wave slowness in an up-going Stoneley wave and a down-going Stoneley wave;
estimate an amplitude of the up-going Stoneley wave and the down-going Stoneley wave;
identify a difference between the amplitude of the up-going Stoneley wave and the down-going Stoneley wave;
sum the amplitude of the up-going Stoneley wave and the down-going Stoneley wave to form an amplitude summation curve; and
identify a location of the leak.

14. The system of claim 13, wherein the amplitude of the up-going Stoneley wave is less than the amplitude of the down-going Stoneley wave.

15. The system of claim 13, wherein the location of the leak is found with a cross-zero point of a difference curve.

16. The system of claim 13, wherein the location of the leak is found with a local maximum on the amplitude summation curve.

17. The system of claim 13, further comprising estimate a level of a leak noise by a value of the amplitude summation curve.

18. The system of claim 13, wherein the amplitude of the up-going Stoneley wave is greater than the amplitude of the down-going Stoneley wave.

19. The system of claim 13, wherein the amplitude of the up-going Stoneley wave is greater than the amplitude of the down-going Stoneley wave, wherein the leak is downhole from the acoustic logging tool.

20. The system of claim 13, wherein the amplitude of the up-going Stoneley wave is less than the amplitude of the down-going Stoneley wave, wherein the leak is up-hole from the acoustic logging tool.

* * * * *